US009168909B2

(12) United States Patent
Kaneko

(10) Patent No.: US 9,168,909 B2
(45) Date of Patent: Oct. 27, 2015

(54) VEHICLE CONTROL DEVICE

(75) Inventor: Kunihiro Kaneko, Saitama (JP)

(73) Assignee: UD TRUCKS CORPORATION, Ageo-shi (JP)

(*) Notice: Subject to any disclaimer, the term of this patent is extended or adjusted under 35 U.S.C. 154(b) by 19 days.

(21) Appl. No.: 14/348,195

(22) PCT Filed: Aug. 13, 2012

(86) PCT No.: PCT/JP2012/070607
§ 371 (c)(1),
(2), (4) Date: Mar. 28, 2014

(87) PCT Pub. No.: WO2013/077041
PCT Pub. Date: May 30, 2013

(65) Prior Publication Data
US 2014/0228171 A1 Aug. 14, 2014

(30) Foreign Application Priority Data
Nov. 21, 2011 (JP) .................................. 2011-253670

(51) Int. Cl.
*B60W 10/02* (2006.01)
*B60W 10/06* (2006.01)
(Continued)

(52) U.S. Cl.
CPC ............... *B60W 10/06* (2013.01); *B60W 10/02* (2013.01); *B60W 10/11* (2013.01); *F16D 48/02* (2013.01); *F16D 48/06* (2013.01); *F16H 61/02* (2013.01); *F16H 63/46* (2013.01); *F16H 63/48* (2013.01); *F16D 2500/3127* (2013.01);
(Continued)

(58) Field of Classification Search
CPC ..... B60W 10/02; B60W 10/06; B60W 10/11; F16H 61/02; F16H 63/46; F16H 63/48; F16D 48/02; F16D 48/06; F16D 48/10; F16D 2500/3127; F16D 2500/50825; F16D 2500/50841; F16D 2500/50883; F16D 2500/70424
See application file for complete search history.

(56) References Cited

U.S. PATENT DOCUMENTS

2006/0111823 A1 5/2006 Tamai
2010/0174465 A1* 7/2010 Gibson et al. ................... 701/70
(Continued)

FOREIGN PATENT DOCUMENTS

CN 1778610 A 5/2006
CN 101616831 A 12/2009
DE 4432456 A1 3/1996
(Continued)

OTHER PUBLICATIONS

International Search Report for International Application No. PCT/JP2012/070607 dated Nov. 20, 2012.

*Primary Examiner* — Jacob S Scott
(74) *Attorney, Agent, or Firm* — Kratz, Quintos & Hanson, LLP

(57) ABSTRACT

The present invention has an object to provide a vehicle control device which does not require a complicated operation to start an engine even if an idle-stop function has been executed. Thus, the present invention includes a mechanical automatic transmission, an idle-stop device (1) for stopping the engine when the vehicle is stopped, a slope detection device (2) for detecting a slope of a road, and a control unit (10), and is characterized in that the control unit (10) has a function for disengaging a clutch and selecting a gear appropriate for the detected slope, when the slope detected by the slope detection device (2) is at or above a threshold value and an operation of the idle-stop device (1) has been requested.

2 Claims, 2 Drawing Sheets

(51) Int. Cl.
*B60W 10/11* (2012.01)
*F16H 61/02* (2006.01)
*F16H 63/46* (2006.01)
*F16H 63/48* (2006.01)
*F16D 48/02* (2006.01)
*F16D 48/06* (2006.01)

(52) U.S. Cl.
CPC ............... *F16D 2500/50825* (2013.01); *F16D 2500/50883* (2013.01); *F16D 2500/70424* (2013.01); *Y10T 477/6403* (2015.01)

(56) References Cited

U.S. PATENT DOCUMENTS

2013/0252785 A1\* 9/2013 Kinoshita et al. ............... 477/97
2014/0243152 A1\* 8/2014 Gibson et al. .................. 477/185

FOREIGN PATENT DOCUMENTS

| JP | 2006-321268 | A1 | 11/2006 |
| JP | 2011-112094 | A1 | 6/2011 |
| JP | 2011-208689 | A1 | 10/2011 |
| KR | 10-0273518 | B | 9/2000 |

\* cited by examiner

VEHICLE CONTROL DEVICE

TECHNICAL FIELD

The present invention relates to control at start of a vehicle or particularly to control when a vehicle temporarily stops at a traffic signal or the like and starts again.

BACKGROUND ART

A vehicle on which a so-called "idle-stop device (ISS)" for the purpose of a fuel consumption-saving traveling has been spreading.

In a prior-art idle-stop device, a transmission is at neutral (N) and also, a clutch is in an engaged state ("engaged" state) while it is operated, that is, when an engine is stopped.

Thus, on a slope or the like, after the idle-stop device is operated, the operation of the idle-stop device is cancelled, and when the vehicle is to be started again, it is necessary that the clutch has to be disengaged once (the clutch is brought into the "disengaged" state) and then, a gear has to be changed and start control has to be performed. Thus, there is a problem that a series of operations take time. In the case of a slope or the like, there is a concern that the vehicle during the above described series of operations (on an uphill slope, for example, the vehicle might retreat).

In order to avoid such movement of the vehicle 1 (a retreat or "sliding down" on an uphill slope), in the case of an operation of the idle-stop device, a parking brake should be applied (a driver should intentionally operate the parking brake) as a condition. Thus, when the operation of the idle-stop device is to be cancelled and the vehicle is to be started, an operation to release the parking brake is also necessary, which makes the operations for vehicle start complicated.

As another prior art, a technology of a transmission device capable of automatic control of a clutch operation and adjustment of a driving force by manual operation of the clutch is proposed (see Patent Literature 1).

However, such prior art (Patent Literature 1) does not solve the above described problem that engine start and vehicle start need complicated operations.

CITATION LIST

Patent Literature

[Patent Literature 1] Japanese Patent Application Non-examined Publication Gazette No. 2011-112094 (JPA 2011-112094

SUMMARY OF INVENTION

Problem to be Solved by Invention

The present invention has been proposed in view of the above described problem of the prior-art and has an object to provide a vehicle control device which does not require a complicated operation for engine start and vehicle start even if an idle-stop function has been executed.

Solution to Problem

A vehicle control device of the present invention includes a mechanical automatic transmission, an idle-stop device (1: ISS) for stopping an engine when a vehicle is stopped, a slope detection device (2) for detecting a slope of a road, and a control unit (10), and the control unit (10) has a function of disengaging a clutch and selecting a gear appropriate for the detected slope if the slope defected by the slope detection device (2) is at or above a threshold value and an operation of the idle-stop device (1) has been requested (if a switch for operating an idle-stop function on a driver's seat side is operated, for example).

Moreover, in the present invention, a parking brake operation detection, device (3) for detecting whether or not a parking brake is operated and a slope start assisting device (9) for automatically operating a brake (main brake) are provided, and the control unit (10) preferably has a function of operating the slope start assisting device (9) when an operation of the idle-stop device (1) is allowed, and it is detected by the parking brake operation detection device (3) that the parking brake is not operated.

Advantageous Effects of Invention

According to the present invention provided, with the above described configurations, if the slope is at or above the threshold value and the operation of the idle-stop device (1) has been requested, the clutch is disengaged (the clutch is brought into the "disengaged" state) and a gear appropriate for the detected slope is set and then, a signal allowing the idle-stop function is transmitted, and the engine is stopped.

That is, since the clutch has been disengaged (the clutch has been brought into the "disengaged" state) when the engine is stopped, when the engine is started again, the engine can be started without acting of an excessive load. Moreover, since the gear appropriate for the slope of the road has been already selected (set) when the engine is stopped, if the engine is to be started again so as to start the vehicle, the vehicle can be simply started only with an operation of engaging the clutch.

In the present invention, if the slope is smaller than the threshold value, similarly to a normal idle-stop device, when the operation of the idle-stop device (1) is requested, the clutch has been already engaged, and the gear is set at neutral. Since the gear is set at neutral, when the engine is operated, no excessive load acts. At the start, the clutch is disengaged, and the gear appropriate for the vehicle start is set.

Moreover, in the present invention, if a slope start assisting device (8) is provided, even if the parking brake is not operated, the idle-stop function is operated if the slope of the road is steep, and when the engine is stopped, the brake (main brake) can be operated as necessary.

Thus, movement of the vehicle in a state unexpected by the driver due to the slope of the road (occurrence of so-called "sliding down" on an uphill slope) is prevented.

DESCRIPTION OF EMBODIMENTS

An embodiment of the present invention will be described below by referring to the attached drawings.

Figure 1:
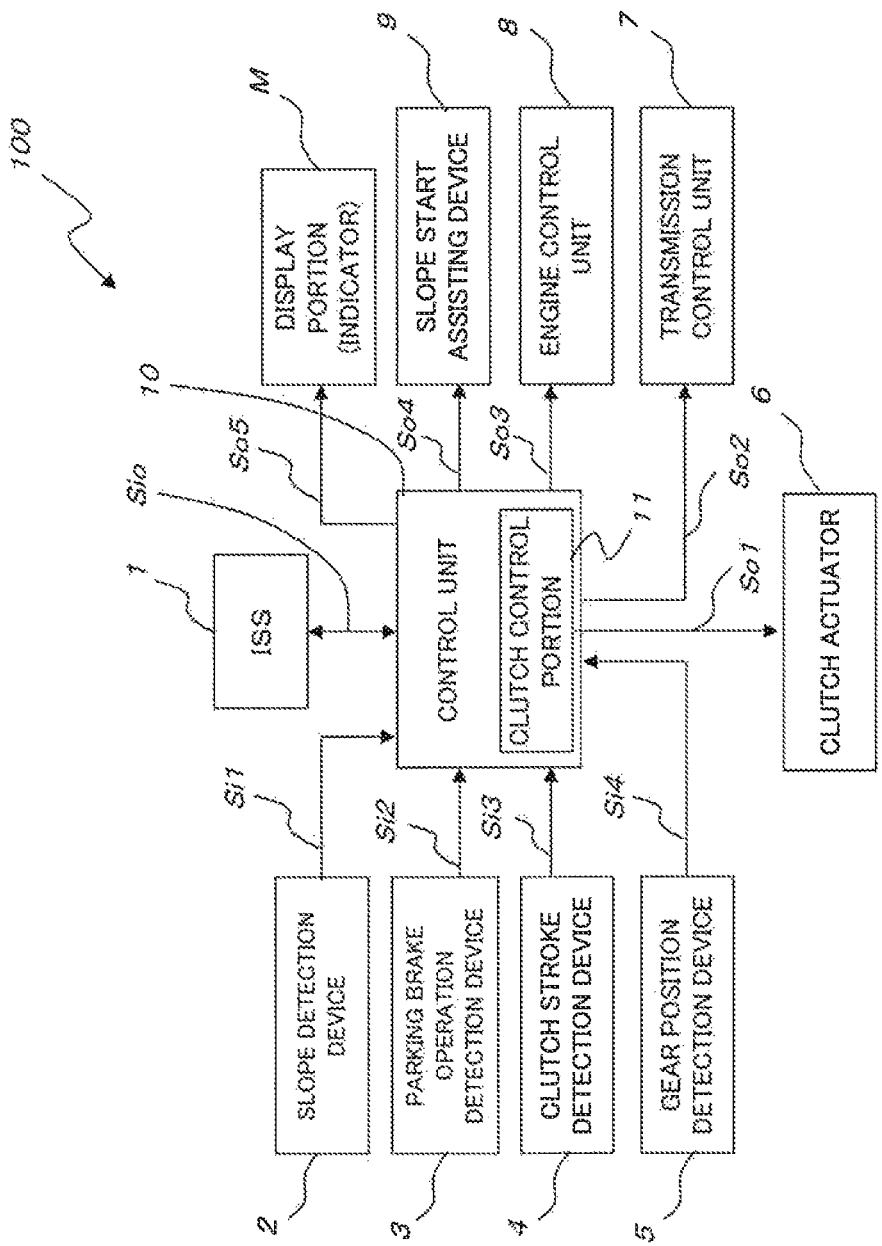
FIG. 1 is a block diagram of an embodiment of the present invention.

In FIG. 1, a vehicle control device denoted as a whole by the reference numeral 100 includes an idle-stop device (ISS) 1, a slope detection device 2, a parking brake operation detection device 3, a clutch stroke detection device 4, a gear position detection device 5, a clutch actuator 6, a transmission control unit 7, an engine control unit 8, a slope start assisting device 9, a display portion M (all the indicators on an instrument panel are illustrated, for example), and a control unit 10 which is control means.

The idle-stop device (ISS) 1 is connected to the control unit 10 by a bidirectional signal line Sio.

The slope detection device 2 is connected to the control unit 10 by an input signal line Si1.

The parking brake operation detection device 3 is connected to the control unit 10 by an input signal line Si2.

The clutch stroke detection device 4 is connected to the control unit 10 by an input signal line Si3.

The gear position detection device 5 is connected to the control unit 10 by an input signal line Si4.

The control unit 10 is connected to the clutch actuator 6 by a control signal line Si4.

Moreover, the control unit 10 is connected to the transmission control unit 7 by a control signal line So2.

Moreover, the control unit 10 is connected to the engine control unit 8 by a control signal line So5.

Moreover, the control unit 10 is connected to the slope start assisting device 9 by a control signal line So4.

Furthermore, the control unit 10 is connected to the display portion M by a control signal line So5.

As the slope detection device 2, road slope information from a communications satellite (by GPS, for example) can be used, for example. Alternatively, by providing a road surface inclination gauge on the vehicle, a measured value of the road surface inclination gauge can be also used.

Moreover, in the slope start assisting device 9, braking before start of the vehicle is performed not by the parking brake but by a main brake (so-called "foot brake").

The control unit 10, which will be described later by referring to FIG. 2, has a function of disengaging the clutch (to bring the clutch into the "disengaged" state) and selecting a gear appropriate for the detected slope if the slope detected by the slope defection device 2 is at or above a threshold value and also, an operation of the idle-stop device 1 has been requested (if a switch for operating the idle-stop function on a driver's seat side, not shown, has been operated, for example).

The control unit 10, which will be similarly described later by referring to FIG. 2, has a function of operating the slope start assisting device 9 if the operation of the idle-stop device 1 is allowed and also, it is detected by the parking brake operation detection device 3 that the parking brake is not operated.

Subsequently, by referring to FIG. 2, control until the idle-stop device (ISS) 1 is operated and the engine is stopped in the illustrated embodiment will be described.

Figure 2:
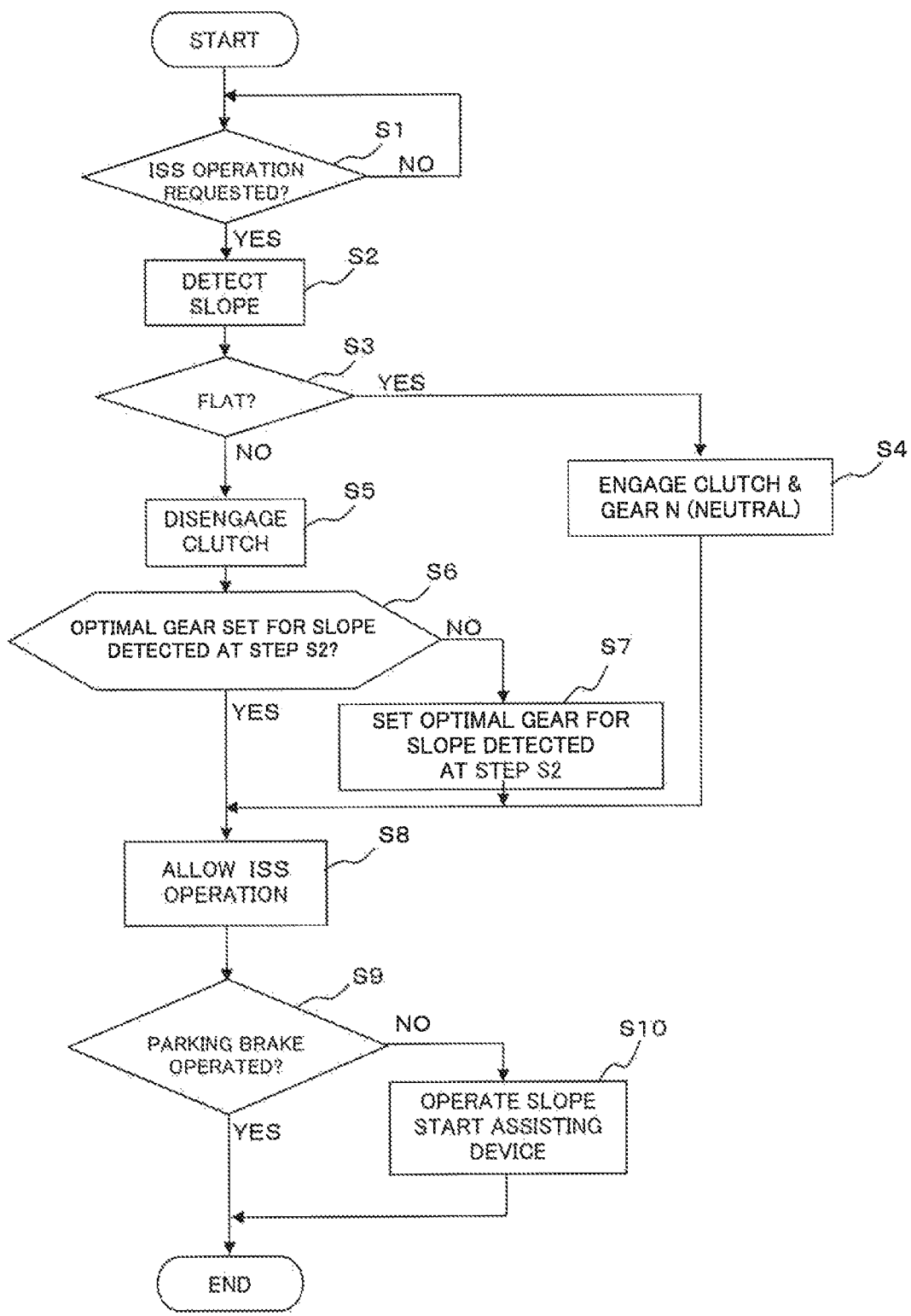
FIG. 2 is a flowchart illustrating control at start of a vehicle after idling stop in the embodiment.

At Step S1 in FIG. 2, the control unit 10 determines whether or not an operation request to the idle-stop device 1 has been made. Whether or not an operation request to the idle-stop device 1 has been made can be determined on the basis of whether or not the vehicle is stopped, and a switch of the idle-stop device in the vicinity of the driver's seat has been, pressed, for example.

If the operation request to the idle-stop device 1 has been made (YES at Step S1), the routine proceeds to Step S2. On the other hand, if the operation request to the idle-stop device 1 has not been made (NO at Step S1), the routine returns to Step S1, and Step S1 is repeated (loop of NO at Step S1).

At Step S2, a slope at a vehicle stop position is detected by the slope detection device 2, and the routine proceeds to Step S3. At Step S3, the control unit 10 determines whether or not the vehicle stop position is flat from a value of the detected slope.

Here, in the illustrated embodiment, assuming that the slope is θ, for example, if Tan θ≤0.02, it is determined to be "flat", and if Tan θ>0.02, it is determined to be "not flat (a slope)".

If the vehicle stop position is flat (YES at Step S3), the routine proceeds to Step S4, while if the vehicle stop position is not flat (NO at Step S3), the routine proceeds to Step S5.

Here, contrary to the illustration in FIG. 2, Step S2 and Step S3 can be executed prior to Step S1. Alternatively, Step 1 and Steps S2 and S3 can be executed at the same time.

At Step S4, since it is "flat" (YES at Step S3), the control similar to that during an operation of the normal idle-stop device 1 is executed. That is, the clutch is engaged and the gear of the transmission is set at neutral. Then, the routine proceeds to Step S8.

On the other hand, at Step S5, since it is determined to be "not flat" (NO at Step S3), if the clutch is engaged and the gear of the transmission is set to neutral similarly to the normal idle-stop device 1, the operation until the idle-stop device 1 is canceled and the vehicle is started, becomes complicated. Thus, after it is determined to be "not flat" (NO at Step S3), at Step S3, the clutch is disengaged (brought into the "disengaged" state), and the routine proceeds to Step S6. At Step S6, the control unit 10 determines whether or not the optimal gear is set for the slope detected at Step S2.

If the optimal gear is set for the slope detected at Step S2 (YES at Step S6), the routine proceeds to Step S8. On the other hand, if the optimal gear is not set for the slope defected at Step S2 (NO at Step S6), the routine proceeds to Step S7.

At Step S7, the control unit 10 sends a control signal to the transmission control unit 7 so as to realize connection for the optimal gear to the slope detected at Step S2. Then, the routine proceeds to Step S8.

In other words, in the case of Step S5 in which it is determined to be "not flat" (NO at Step S3), the clutch is disengaged (brought into the "disengaged" state), and the optimal gear is set to the slope detected at Step S2.

At Step S8, a permission to operate the idle-stop device 1 is given (the engine is brought into a stoppable state). Then, the routine proceeds to Step S9.

At Step S9, the control unit 10 determines whether or not the parking brake is operated.

If the parking brake is operated (YES at Step S9), control is finished as it is (the state enters an idling stop, and the engine is stopped).

On the other hand, if the parking brake is not operated (NO) at Step S9), the slope start assisting device 9 is operated at Step S10, and braking by the main brake (so-called "foot brake") is performed. Then, the control is finished (the state enters an idling stop, and the engine is stopped.

Though not shown, well-known technologies can be used as they are as means and control for starting the engine again so as to start traveling of the vehicle from the idling stop state.

According to the illustrated embodiment, if the slope is at or above the threshold value and also, the operation of the idle-stop device 1 has been requested, the clutch is disengaged, the gear appropriate for the detected slope is set and then, a signal allowing the idling function is transmitted, and the engine is stopped.

Since the clutch has been already disengaged when the engine is stopped, when the engine is to be started again, the engine can be started without acting of an excessive load. Moreover, since the gear appropriate for the slope of the road has been already selected (set) when the engine is stopped, when the engine is started again, and the vehicle is started, the vehicle can be simply started only with the operation of engaging the clutch.

When the slope is smaller than the threshold value, if the operation of the idle-stop device 1 is requested, similarly to the case of the normal (existing) idle-stop device, the clutch is engaged, but the gear is at neutral. In this case, the gear is at neutral, and the road surface is flat, and thus, when the engine is operated, no excessive load acts. At start of the vehicle, the clutch is disengaged, and the gear appropriate for start of the vehicle is set.

Moreover, in the illustrated embodiment, by providing the slope start assisting device 9, even if the parking brake is not operated, when the idle-stop function is operated if the slope of the road is steep, the brake (main brake) is operated as necessary. Thus, movement of the vehicle in the state unexpected by the driver (so-called "sliding down") due to the slope of the road can be also prevented.

The illustrated embodiment is only an exemplification and is not a description intended to limit the technical range of the present invention.

DESCRIPTION OF REFERENCE NUMERALS OR SYMBOLS

1 idle-stop device
2 slope detection device
3 parking brake operation detection device
4 clutch stroke detection device
5 gear position detection device
6 clutch actuator
7 transmission control unit
8 engine control unit
9 slope start assisting device
10 control means/control unit
100 vehicle control device

The invention claimed is:

1. A vehicle control device comprising:
a mechanical automatic transmission;
an idle-stop device for stopping an engine when a vehicle is stopped;
a slope detection device for detecting a slope of a road; and
a control unit wherein
the control unit has a function of disengaging a clutch and selecting a gear appropriate for the detected slope if the slope detected by the slope detection device is at or above a threshold value and an operation of the idle-stop device has been requested.

2. The vehicle control device according to claim 1, further comprising:
a parking brake operation detection device for detecting whether or not a parking brake is operated; and
a slope start assisting device for automatically operating a brake, wherein
said control unit has a function of operating the slope start assisting device when an operation of the idle-stop device is allowed, and it is detected by the parking brake operation detection device that the parking brake is not operated.

* * * * *